3,105,858
PROCESS FOR REMOVING ACETYLENIC HYDROCARBON IMPURITY
Alfred N. Kresge, Oakmont, William A. Pardee, Fox Chapel, and John V. Ward, Oakmont, Pa., assignors to Gulf Research & Development Company, Pittsburgh, Pa., a corporation of Delaware
No Drawing. Filed Oct. 3, 1960, Ser. No. 59,808
3 Claims. (Cl. 260—681.5)

This invention relates to the selective removal of acetylenic hydrocarbons and particularly alpha acetylenic hydrocarbons from hydrocarbon mixtures containing the same.

Hydrocarbon mixtures containing undesirable acetylenic hydrocarbons are known. Thus, in the manufacture of diolefins, such as butadiene, isoprene and piperylene, by pyrolysis of petroleum fractions or other hydrocarbon starting materials, alpha acetylenes are also produced and tend to be recovered along with the desirable diolefin. In the production of olefins such as ethylene by cracking paraffinic hydrocarbons such as ethane, propane and the like acetylenic hydrocarbons are also produced. Although the acetylenic hydrocarbons can be removed from the cracked gas mixture containing the desired olefin by selectively hydrogenating the cracked gas mixture in known manner, a small but significant amount of acetylenic compounds remains in admixture with the olefin.

Olefins and/or diolefins are extensively employed as charge stocks in polymerization processes. When the polymerization process is carried out in the presence of many well-known catalyst systems, for example, a catalyst system comprising an alkyl aluminum compound and a heavy metal compound such as a titanium halide, the presence of even small amounts of acetylenic compounds in admixture with the olefin or diolefin to be polymerized has a tendency to reduce the yield of polymer and decrease catalyst life. Accordingly, it is desired in such cases to substantially reduce the amount of acetylenic hydrocarbons in the charge mixture prior to polymerization.

We have found that the acetylenic hydrocarbon content of a hydrocarbon mixture can be substantially reduced by passing the same over a catalyst containing an oxide selected from the group consisting of alumina, silica, magnesia and mixtures thereof having an effective $pK_a$ acidity of about $+8.0$ to about $+1.5$, which catalyst has been pretreated at a temperature of about 900° to about 1200° F., preferably a temperature of about 1000° to about 1100° F. and any suitable pressure, for example from atmospheric to about 200 pounds per square inch gauge, for any suitable length of time, for example from about one to about 24 hours. It is believed that as a result of such heating water associated with the catalyst is driven therefrom and the catalyst thereby made selective for the process of this invention.

The mixtures to be purified of their acetylenic hydrocarbon impurity can be, in general, one containing, for example, about 75 to about 99 percent by weight of the monoolefin or diolefin or both. By "monoolefin" we intend to include compounds such as ethylene, propylene, butylene, pentene, etc. and by "diolefin" compounds such as butadiene, isoprene, etc. The acetylenic hydrocarbon impurity which is to be removed from the hydrocarbon mixture which is to be purified in accordance with the process of this invention includes acetylene, methyl acetylene, vinyl acetylene, propyl acetylene, isopropyl acetylene, etc. In general the acetylenic hydrocarbon impurity can be from about 0.001 to about 2.0 percent by weight of the mixture being purified. Materials in addition to the above, such as, for example paraffins, inerts such as nitrogen, argon, etc., can also be present in amounts which can vary from about 0.001 to about 25.0 percent by weight of the mixture, but in general the hydrocarbon mixture is characterized by its monoolefin and/or diolefin content.

The catalyst to be used in the purification process of this invention is critical and can be defined as an oxide selected from the group consisting of alumina, silica, magnesia and mixtures thereof having an effective $pK_a$ acidity from about $+8.0$ to about $+1.5$, preferably about $+6.8$ to about $+3.3$. By "$pK_a$ acidity" we means the acidity determined as described by Benesi in the Journal of the American Chemical Society, volume 78, pages 5490 to 5494 (1956). Impurities or other materials such as water, minor or trace amounts of metals such as iron, manganese, chromium, vanadium, etc., can be present in admixture with the catalyst, provided the effective acidity of the catalyst remains within the defined range. In the event the $pK_a$ acidity is less than about $+8.0$, little or no purification will result, whereas if the $pK_a$ acidity of the catalyst is in excess of about $+1.5$ excessive polymerization of the olefinic and/or diolefinic constituents will result. In general while the particle size of the catalyst is not critical, catalyst having a surface area of about 100 to about 500 square meters per gram is satisfactory.

Pressures of about 50 to about 500 pounds per square inch gauge can be employed. In general it is preferred, however, that the pressures be sufficiently high to maintain the mixture being purified in liquid form so that the catalyst surface can be washed free of polymer and dimer by the action of the liquids as it moves over the catalyst surface. Temperatures can be from about 80° to about 250° F., preferably about 80° to about 175° F. Space velocities of about 0.1 to about 5.0, preferably about 0.25 to about 1.0, volumes of feed per volume of catalyst per hour are satisfactory.

While we are not certain what action is involved in the purification procedures of this invention we believe it to be one of selective polymerization of the acetylenic compounds. Some of the polymers which are formed will deposit on the catalyst surface, although, as pointed out above, the washing action of the mixture being treated when said mixture is a liquid at reaction conditions will tend to minimize the amount of deposits. The remainder of the polymer will exit from the reaction zone with the treated mixture and can be separated therefrom in any convenient manner, for example by distillation.

The process of this invention can further be illustrated by the following.

Several runs were made using Alcoa F-10 activated alumina having the following analysis in weight percent: 98 percent $Al_2O_3$, 0.1–1.0 percent iron, 0.1–1.0 percent chlorides, 0.01–0.1 percent sodium and $<0.01$ percent each of magnesium, manganese, tin, calcium, silicon and sulfur. In each run the catalyst was subjected to a heat pretreatment step wherein water was driven therefrom. The catalyst so obtained was thereafter employed to purify a hydrocarbon stream analyzing as follows.

Charge properties:
    Butadiene, percent by weight _____ 97.3
    Butadiene polymer, percent by weight _____ 1.0
    Butenes, percent by weight _____ 1.6
    Acetylene, parts per million _____ 505

The data obtained are summarized below in Table I.

Table I

| Run No | 1 | | 2 | | 3 | | 4 | | | | 5 | | | | |
|---|---|---|---|---|---|---|---|---|---|---|---|---|---|---|---|
| Catalyst Pretreatment Conditions: | | | | | | | | | | | | | | | |
| Temperature, °F | 300 | | 600 | | 900 | | 950 | | | | 1,050 | | | | |
| Pressure, Pounds Per Square Inch Gauge | 0 | | 0 | | 0 | | 0 | | | | 0 | | | | |
| Nitrogen Gas Rate, Std. Cubic Ft. Per Hr | 2 | | 2 | | 2 | | 2 | | | | 2 | | | | |
| Time, Hours | 24 | | 24 | | 24 | | 24 | | | | 24 | | | | |
| Wt. Percent of Catalyst Removed as Water | 1.2 | | 2.7 | | 3.9 | | 4.0 | | | | 4.4 | | | | |
| pK$_a$ Acidity | >+8.0 | | >+8.0 | | +3.3 to +6.8 | | +3.3 to +6.8 | | | | +3.3 to +6.8 | | | | |
| Reaction Conditions: | | | | | | | | | | | | | | | |
| Pressure, Pounds Per Square Inch Gauge | 200 | | 200 | | 200 | | 200 | | | | 200 | | | | |
| Temperature, °F | 150 | | 150 | | 150 | | 150 | | | | 150 | | | | |
| Liquid Hourly Space Velocity | 0.65 | | 0.65 | | 0.65 | | 0.65 | | | | 0.65 | | | | |
| Throughput, Volume Per Volume of Catalyst | 8.1 | 32.5 | 4.2 | 6.0 | 6.0 | 22.6 | 11.9 | 23.2 | 32.4 | 35.2 | 7.5 | 21.6 | 30.5 | 34.7 | 36.9 |
| Product: | | | | | | | | | | | | | | | |
| Acetylene, Parts Per Million | 472 | 505 | 190 | 298 | 4.0 | 124 | 3.0 | 45 | 90 | 118 | 0 | 19 | 33 | 56 | 70 |

The data in Table I clearly illustrate the advantages of operating in accordance with the improved process of our invention. Thus in run No. 1 wherein the catalyst was heated, prior to the operation, only to a temperature of 300° F., even at a throughput of 8.1 the reduction in the amount of acetylene was extremely slight. At a throughput of 32.5 there was no acetylene removal. In run No. 2 though the catalyst was pretreated at a temperature of 600° F. the results obtained, even at low throughputs, were poor. These results should be contrasted with those obtained in runs 3, 4 and 5 wherein the catalyst was pretreated at a temperature of from 900° to 1050° F. Even at relatively high throughputs the acetylenic content of the treated charge was reduced substantially.

Obviously, many modifications and variations of the invention as hereinabove set forth can be made without departing from the spirit and scope thereof, and therefore only such limitations should be imposed as are indicated in the appended claims.

We claim:

1. A process for the removal of an acetylenic hydrocarbon impurity from a hydrocarbon mixture containing the same which comprises passing said hydrocarbon mixture over a catalyst consisting essentially of alumina having an effective pK$_a$ acidity of about +8.0 to about +1.5 at a temperature of about 80° to about 250° F., said catalyst having been pretreated by heating the same at an elevated temperature of about 900° to about 1200° F.

2. A process for the removal of an acetylenic hydrocarbon impurity from a hydrocarbon mixture containing the same and diolefins which comprises passing said hydrocarbon mixture over a catalyst consisting essentially of alumina having an effective pK$_a$ acidity of about +8.0 to about +1.5 at a temperature of about 80° to about 250° F., said catalyst having been pretreated by heating the same at an elevated temperature of about 900° F. to about 1200° F.

3. A process for the removal of acetylene from a hydrocarbon mixture containing the same and butadiene which comprises passing said hydrocarbon mixture over a catalyst consisting essentially of alumina having an effective pK$_a$ acidity of about +8.0 to about +1.5 at a temperature of about 80° to about 250° F., said catalyst having been pretreated by heating the same at an elevated temperature of about 900° F. to about 1200° F.

References Cited in the file of this patent

UNITED STATES PATENTS

| 2,840,531 | Fleming et al. | June 24, 1958 |
| 2,959,627 | Fleming et al. | Nov. 8, 1960 |